US009632988B2

(12) United States Patent
Brownlow et al.

(10) Patent No.: US 9,632,988 B2
(45) Date of Patent: Apr. 25, 2017

(54) AUTONOMOUS GADGET MANAGEMENT SYSTEM

(75) Inventors: Sean T. Brownlow, Rochester, MN (US); Brian J. Cragun, Rochester, MN (US); Michael T. Kalmbach, Elgin, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 788 days.

(21) Appl. No.: 13/566,102

(22) Filed: Aug. 3, 2012

(65) Prior Publication Data

US 2014/0040711 A1    Feb. 6, 2014
US 2016/0217107 A9    Jul. 28, 2016

Related U.S. Application Data

(60) Provisional application No. 61/670,841, filed on Jul. 12, 2012.

(51) Int. Cl.
| | |
|---|---|
| *G06F 17/21* | (2006.01) |
| *G06F 17/22* | (2006.01) |
| *G06F 17/30* | (2006.01) |
| *G06F 17/24* | (2006.01) |

(52) U.S. Cl.
CPC ........ *G06F 17/2247* (2013.01); *G06F 17/211* (2013.01); *G06F 17/212* (2013.01); *G06F 17/2241* (2013.01); *G06F 17/24* (2013.01); *G06F 17/3089* (2013.01); *G06F 17/30905* (2013.01)

(58) Field of Classification Search
CPC ....................... G06F 17/30056; G06F 17/2247
USPC ........................................................ 715/202
See application file for complete search history.

(56) References Cited

U.S. PATENT DOCUMENTS

| | | | |
|---|---|---|---|
| 7,533,142 B2 | 5/2009 | Ng et al. | |
| 7,581,173 B1 * | 8/2009 | Ferguson | .......... G06F 17/30899 715/235 |
| 7,694,000 B2 | 4/2010 | Flores et al. | |
| 7,739,310 B1 * | 6/2010 | Shmulevich et al. | ........ 707/802 |
| 7,853,884 B2 | 12/2010 | Olander et al. | |
| 7,873,908 B1 | 1/2011 | Varanasi et al. | |
| 7,917,858 B2 | 3/2011 | Pereira et al. | |
| 8,347,228 B1 * | 1/2013 | Kates et al. | ................... 715/821 |
| 2003/0067485 A1 * | 4/2003 | Wong et al. | ................... 345/747 |
| 2004/0070627 A1 * | 4/2004 | Shahine et al. | ................ 345/794 |
| 2004/0230901 A1 * | 11/2004 | Godwin | ............ G06F 17/30905 715/236 |
| 2005/0187895 A1 * | 8/2005 | Paya | ................... G06F 17/3089 |
| 2005/0187987 A1 | 8/2005 | Lim | |

(Continued)

OTHER PUBLICATIONS

Getting Started, facebook developers, 2012, <http://developers.facebook.com/docs/>.

(Continued)

*Primary Examiner* — Frank D Mills
(74) *Attorney, Agent, or Firm* — Patterson + Sheridan, LLP

(57) ABSTRACT

Techniques are described for outputting web page components, or gadgets, on a web page or other graphical user interface. A gadget automatically conforms to particular styles based on the styles of the other gadgets and of controlling relationships to the other gadgets that are determined from page analysis and other policies.

17 Claims, 5 Drawing Sheets

(56) References Cited

U.S. PATENT DOCUMENTS

| | | | |
|---|---|---|---|
| 2005/0246632 A1* | 11/2005 | Guido et al. | 715/517 |
| 2006/0010390 A1* | 1/2006 | Guido et al. | 715/742 |
| 2006/0015846 A1* | 1/2006 | Fraleigh et al. | 717/109 |
| 2006/0031377 A1* | 2/2006 | Ng et al. | 709/208 |
| 2006/0053376 A1* | 3/2006 | Ng et al. | 715/742 |
| 2006/0085745 A1* | 4/2006 | Anderson | G06F 9/4443 715/273 |
| 2006/0089990 A1* | 4/2006 | Ng et al. | 709/227 |
| 2006/0184882 A1* | 8/2006 | Molander et al. | 715/733 |
| 2006/0235935 A1* | 10/2006 | Ng | 709/208 |
| 2007/0006136 A1* | 1/2007 | Hirschberg et al. | 717/105 |
| 2007/0157082 A1* | 7/2007 | Green | G06F 17/3089 715/234 |
| 2009/0309894 A1* | 12/2009 | Lam | G06F 17/211 345/582 |
| 2010/0050130 A1* | 2/2010 | Farn | 715/853 |
| 2010/0146378 A1* | 6/2010 | Bank et al. | 715/234 |
| 2010/0180194 A1* | 7/2010 | Ji et al. | 715/234 |
| 2010/0197219 A1* | 8/2010 | Issa et al. | 455/3.06 |
| 2010/0313140 A1* | 12/2010 | Bank et al. | 715/747 |
| 2011/0167368 A1* | 7/2011 | Murakami et al. | 715/767 |
| 2011/0173627 A1* | 7/2011 | Murakami et al. | 718/103 |
| 2011/0191316 A1 | 8/2011 | Lai et al. | |
| 2011/0247031 A1* | 10/2011 | Jacoby | 725/25 |
| 2013/0159839 A1* | 6/2013 | Joffray | G06F 17/2252 715/235 |
| 2013/0246909 A1* | 9/2013 | Carroll | G06F 17/227 715/235 |

OTHER PUBLICATIONS

OpenSocial Gadgets API Specification v0.9, OpenSocial and Gadgets Specification Group, Apr. 2009, <http://opensocial-resources.googlecode.com/svn/spec/0.9/Gadgets-API-Specification.xml>.

\* cited by examiner ized as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

AUTONOMOUS GADGET MANAGEMENT SYSTEM

BACKGROUND

Modern websites are often constructed using a collection of reusable components, sometimes referred to as "widgets," "portlets," and "plug-ins." These components are designed to be relatively easy for web developers or end users to plug in the components into a website. For example, websites such as My Yahoo!, available from Yahoo!, Inc., or iGoogle, available from Google, Inc., allow users to customize their home page by plugging in various widgets that provide access to such features as an email inbox, stock quotes, sports scores, news feeds, etc. Conventional widgets are typically designed to allow the webpage in which they are contained (e.g., its "parent page") to dictate the widgets' rendering style. Such widgets are designed to be brand neutral to allow the widget to visually accommodate a variety of websites. In some cases, this brand neutrality is implemented using Cascading Style Sheet ("CSS") rules that display a widget according to pre-defined coding or style rules, for example, as defined by a CSS style attribute assigned to its parent page.

SUMMARY

Embodiments of the disclosure provide a method, product and system for performing an operation for outputting a plurality of gadgets on a web page, that includes determining priority levels for a plurality of gadgets according to one or more hierarchy policies for the web page and determining one or more style policies that specify a modification of the plurality of gadgets according to the determined priority levels. The operation further includes outputting the plurality of gadgets according to the determined style policies and the priority status of each gadget relative to the plurality of gadgets.

Figure 1:
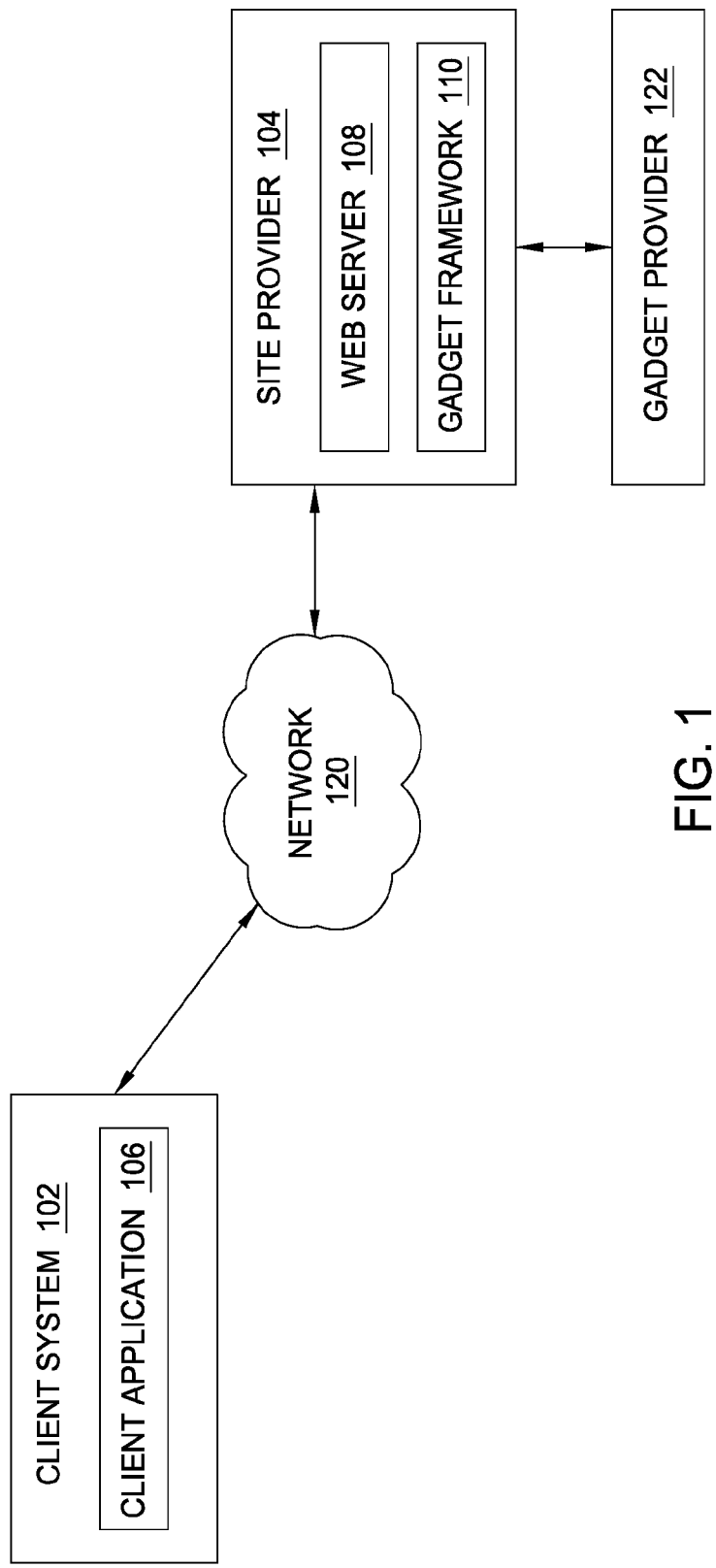
FIG. 1 is a block diagram illustrating a computer infrastructure for displaying a gadget in a user interface based on peer gadgets, according to one embodiment of the disclosure.

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the disclosure provide a technique for automatically conforming web page components (referred to as "gadgets") to particular styles when a web page is styled. In one embodiment, page analysis and gadget policies are performed to provide conformity among gadgets in a manner that enables cooperative "peer pressure" between gadgets.

In the following, reference is made to embodiments of the disclosure. However, it should be understood that the aspects of present disclosure are not limited to specific described embodiments. Instead, any combination of the following features and elements, whether related to different embodiments or not, is contemplated to implement and practice aspects of the present disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access web pages and gadgets and any related data available in the cloud. For example, the gadget may request information or a data feed from a process executing on a computing system in the cloud. In another example, the library of available gadgets may be stored at a storage location in the cloud. Doing so allows the gadgets and any related information to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates one embodiment of a computing infrastructure for a site provider. A client system 102 wishes to access a web application, website, or other web-based documents provided by a site provider 104. In one embodiment, the client system 102 includes a client application 106 configured to communicate via a communications network 120 and interact with the site provider 104, and receive and render a web page received from the site provider 104. In one implementation, the client application 106 may be a web browser application used to transmit an HTTP request message, and then receive and render the web page received from the site provider 104.

The site provider 104 includes a web server 108 and a gadget framework 110 configured to provide a web site that includes one or more gadgets configured according to embodiments of the present disclosure. In one embodiment, the web server 108 of the site provider 104 receives a URL and generates a response formatted as an HTML document. The returned response includes scripting logic, such as JavaScript, that may be interpreted by the client application 106 to modify the display of the HTML document according to techniques described herein. For example, the returned response may include a portion of the gadget framework 110 embodied as a client-side scripting library, executable by the client application 106 to modify gadgets contained in the returned web page. The gadget framework 110 may incorporate one or more gadgets into a web page using a variety of mechanisms, such as via direct incorporation of HTML code, framed elements (e.g., <iframe>), embedded objects (e.g., <object>), dynamic insertion via JavaScript, etc. The one or more gadgets may be provided directly by the site provider 104, or, additionally, may be offered by a third-party, such as a gadget provider 122.

In one embodiment, the computing infrastructure 100 may include existing computer systems, e.g., desktop computers, server computers, laptop computers, tablet computers and the like. The computing infrastructure 100 illustrated in FIG. 1, however, is merely an example of one computing infrastructure. Embodiments of the present disclosure may be implemented differently, regardless of whether the computer systems are complex multi-user computing systems, such as a cluster of individual computers connected by a high-speed network, single-user workstations or network appliances lacking non-volatile storage. Further, while FIG. 1 illustrates a client-server model, other models are contemplated such as a peer-to-peer model.

Figure 2:
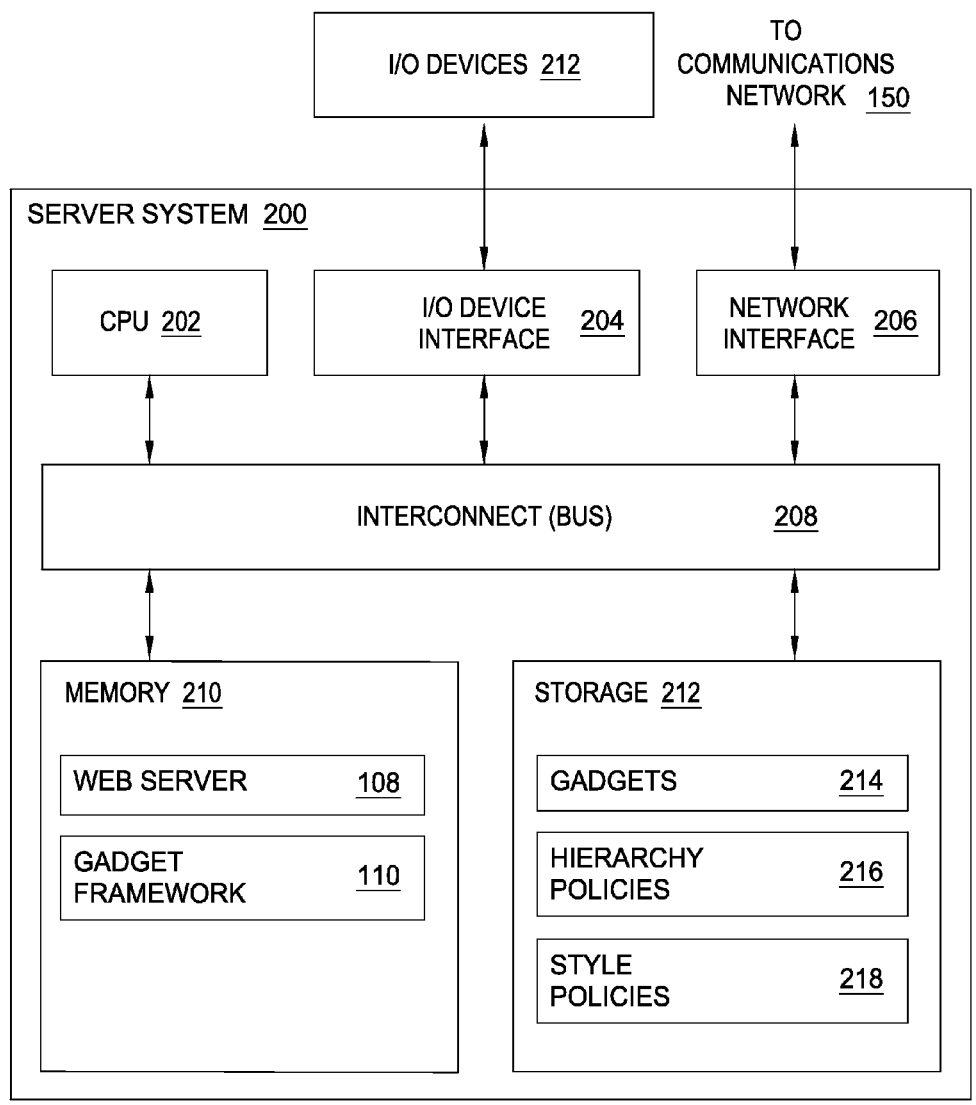
FIG. 2 is a more detailed view of the server computing system of FIG. 1, according to one embodiment of the disclosure.

In one embodiment, the site provider 104 utilizes a server system to provide web sites having gadgets, as shown in a more detailed view in FIG. 2. As shown, a server system 200 includes a central processing unit (CPU) 202, a network interface 206, an interconnect 208, a memory 210, and storage 212. The server system 200 may also include an I/O device interface 204 connecting I/O devices (e.g., keyboard, display and mouse devices) to the server system 200. CPU 202 is configured to retrieve and execute programming instructions stored in the memory 210 and storage 212. Similarly, the CPU 202 is configured to store and retrieve application data residing in the memory 210 and storage 212. The interconnect 208 is configured to move data, such as programming instructions and application data, between the CPU 202, I/O device interface 204, storage unit 212, network interface 206, and memory 210. CPU 202 is included to be representative of a single CPU, multiple CPUs, a single CPU having multiple processing cores, and the like. Memory 210 is generally included to be representative of a random access memory. The network interface 206 is configured to transmit data via the communications network 120. Although shown as a single unit, the storage 212 may be a combination of fixed and/or removable storage devices, such as fixed disc drives, floppy disc drives, tape drives, removable memory cards, optical storage, network attached storage (NAS), or a storage area-network (SAN).

As shown, the memory 210 stores a web server 108 and a gadget framework 110, and the storage 212 includes a plurality of gadgets 214, hierarchy policies 216, and style policies 218. The web server 108 is generally configured to respond to requests from clients, such as the client application 106 of FIG. 1. In one embodiment, the web server 108 is configured to use gadget framework 110 to generate HTML documents having a plurality of gadgets 214 contained therein. The gadget framework 110 enables a gadget 214 to be included in a web page with other gadgets. In general, gadgets 214 are self-contained components or applications that provide some functionality and that are incorporated into a containing user interface. Gadgets 214 provide content (e.g., news, stocks, sports, chat) that may be independent of content in other gadgets and of content in the containing web page.

Gadgets 214 may be selected by an end user from a pre-defined library of gadgets 214 stored within storage 212 or may be defined from custom code or scripting logic. In one embodiment, gadgets 214 may be provided by the third-party gadget provider 122 via code reference (e.g., cut-and-paste code that references the third-party gadget provider 122). Gadgets 214 may include application logic itself to be incorporated into a web page, or, alternatively, may include one or more references (e.g., Uniform Resource Locators, or URLs) to files having application logic. Gadgets 214 may further include positional information (e.g., provided by an end user) for arrangement within the user interface and/or relative to other gadgets 214 included therein. In one embodiment, the web server 108 generates a response (e.g., HTML document) that includes one or more gadgets 214 associated with the user of client application 106 and arranged within the HTML document as specified by the positional information. A web page, such as a home page or portal web site, containing gadgets 214 is, however, merely an example of one particular user interface in which gadgets 214 may be included. Embodiments of the present disclosure may be extended and adapted for a variety of user interfaces and graphical interfaces, such as those of a personal desktop, mobile device home screen, and entertainment device screen (e.g., television). In such examples, embodiments of the present disclosure include gadgets 214 inserted into a user interface provided to an end user, rather than incorporate the gadgets 214 into a web page.

The gadget framework 110 enables a gadget 214 to automatically conform its appearance based on other elements in the containing web page, such as other gadgets or page elements. The gadget framework 110 uses one or more hierarchy policies 216 (e.g., defined by a site administrator) to determine which gadgets 214 are designated as a "master gadget," or controlling entity, that defines a priority relative to other gadgets 214 (referred to as "slave gadgets"). As will be described later, within a web page, slave gadgets automatically conform their style to that of master gadgets. The hierarchy policies 216 specify criteria by which gadgets 214 may be dynamically designated as master gadgets, including such criteria as sponsorships or advertising from a gadget provider, content relevancy of a gadget, trending content of a gadget, location of gadget within a page, and user selection and preferences. The hierarchy policies 216 further specify which gadgets 214 behave as slave gadgets towards the designated master element according to, for example, proximity of a gadget to a master gadget within the containing web page. While a "master gadget" is described herein as a particular gadget 214, it is contemplated that hierarchy policies 216 may designate any other page-level element (e.g., an HTML entity) to be a master gadget. Further, while embodiments of the present disclosure describe a master-slave pairing having only two levels of hierarchy (e.g., a master priority level, a normal priority level), multiple levels of hierarchy or priority fall within the scope of the present disclosure. For example, once a priority level of gadgets are determined, controlling style information is "cascaded" to secondary gadgets which, in turn, further cascade information to even lesser priority gadgets.

The gadget framework 110 uses one or more style policies 218 (e.g., defined by a site administrator or end user) to determine how a master gadget influences slave gadgets. In one embodiment, style policies 218 may specify that a master gadget influences the style, layout, and modality of a slave gadget. For example, a style policy may specify that slave gadgets must conform to the same color and typeface scheme as their master gadget. In another example, a style policy may specify that a master gadget dictates how certain types of data may be rendered in a slave gadget, such as by restricting images, video, etc.

Figure 3:
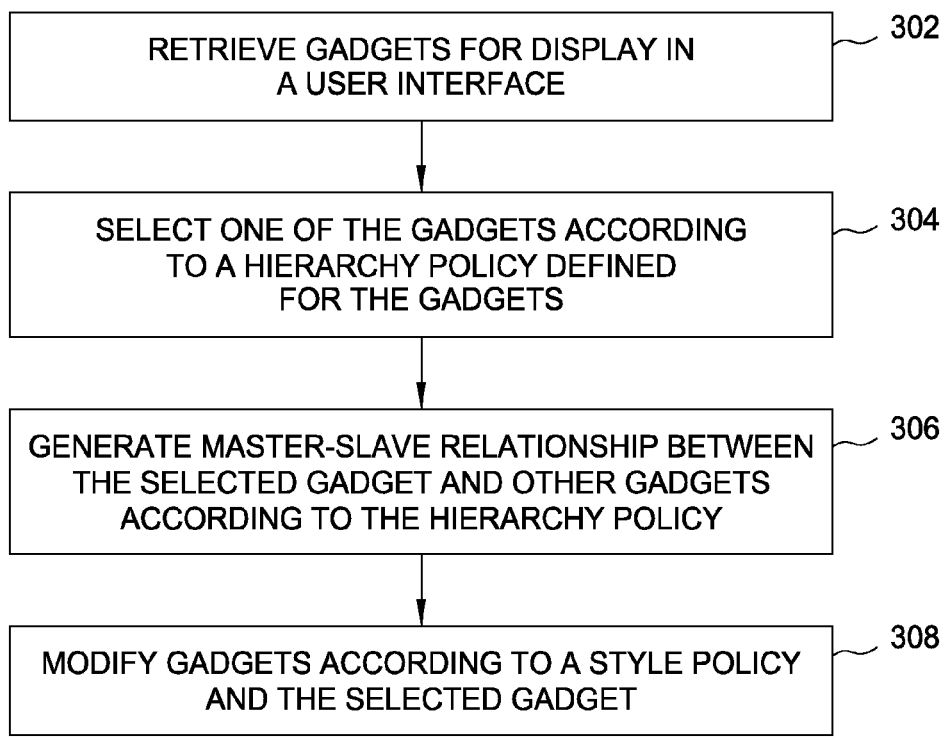
FIG. 3 illustrates a method for generating a user interface having a plurality of gadgets, according to one embodiment of the disclosure.

The operations of the gadget framework 110 are more fully described with respect to FIG. 3. Specifically, FIG. 3 illustrates a method 300 for displaying one or more gadgets within a user interface (e.g., web page), according to one embodiment of the disclosure. While an embodiment of the exemplary method is described in detail as being executed by site provider 104, it should be recognized that alternative embodiments may be adapted to utilize client system 102 to perform one or more steps described below. For example, client system 102 may be configured to execute a scripting module received from site provider 104 that performs the operations of managing display of the one or more gadgets as described below.

As shown, the method 300 begins at step 302, where the gadget framework 110 retrieves one or more gadgets 214 for display in a user interface. In one embodiment, in response to a request submitted by the client system 102 (e.g., by the client application 106), the gadget framework 110 determines which gadgets 214 are associated with the requested web page, and optionally, with the requesting user, and retrieves the gadgets 214 for inclusion in the requested web page.

Figure 4:
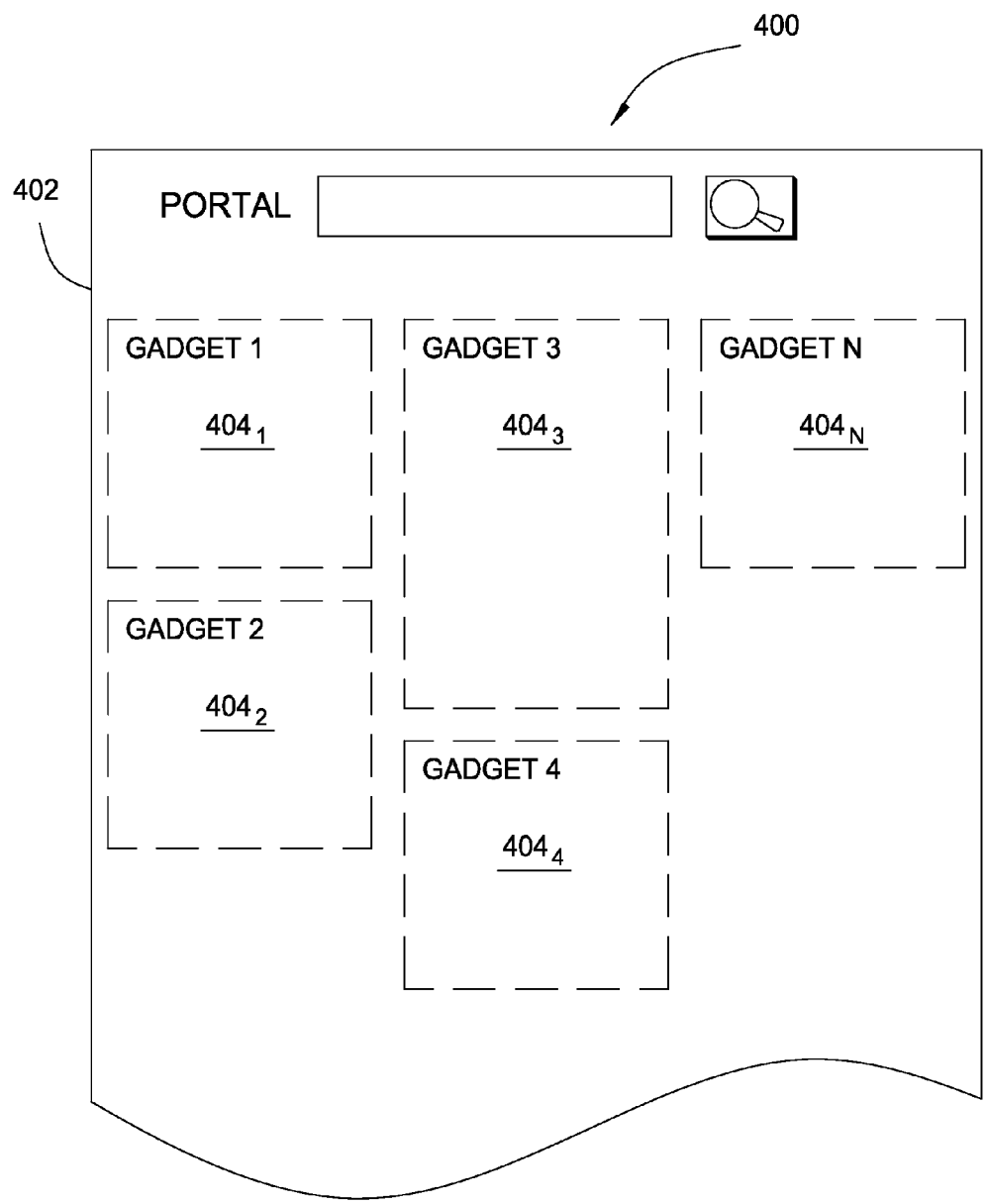
FIG. 4 illustrates an example graphical user interface having a plurality of gadgets, according to one embodiment of the disclosure.

In one embodiment, responsive to a request for a web page of a portal site, the gadget framework 110 retrieves gadgets 214 that are determined to be included in the portal page. For example, a user may have, at an earlier time, customized a portal page by choosing a stock quote gadget and a weather gadget for inclusion in the portal page. Then, responsive to a later request from a user for the portal page, the gadget framework 110 retrieves and includes the stock quotes and weather gadgets when providing the customized portal page. An example of a portal page containing gadgets 214 is shown in FIG. 4. FIG. 4 illustrates an example user interface 400 that includes gadgets displayed in a web page according to one embodiment of the disclosure. The user interface 400 provides a web page 402 (e.g., a portal site) having a plurality of gadgets $404_1$, $404_2$, ... $404_N$ (referred to collectively as gadgets 404) included therein. In the embodiment shown, the gadgets 404 are arranged in positions that define a grid-like configuration. Gadgets $404_1$ and $404_2$, $404_3$ and $404_4$, and $404_N$ are organized into first, second, and third columns, respectively, within the web page 402.

Referring back to FIG. 3, at step 304, the gadget framework 110 selects one of the gadgets 214 to designate as a master gadget according to hierarchy policies 216 defined for the gadgets 214. In one embodiment, a hierarchy policy 216 provided by a site administrator may explicitly specify a particular gadget 214 as a master gadget. For example, the site administrator may explicitly predetermine a prominent gadget styled with the web site's branding and appearance as a default master gadget. In the example of user interface 400 shown in FIG. 4, the gadget framework 110 may select a first gadget $404_1$ to be designated as a master gadget within web page 402. As explained in detail later, the selection of master gadget $404_1$ influences the style and display of other gadgets (e.g., gadgets $404_2$, $404_3$, $404_4$, $404_N$) included on the web page, particularly gadgets $404_2$ and $404_3$ which are depicted as surrounding the master gadget $404_1$.

In one embodiment, the master gadget on a web page may be dynamically determined (e.g., at time of user request) according to hierarchy policies 216 that may use a variety of approaches to automatically chose a master gadget. In one approach, a hierarchy policy 216 specifies a promotional status of a gadget 214 that grants the gadget 214 priority to be a master gadget. Gadget providers may pay a surcharge or "premium" fee to the web site provider to have their gadgets designated as master gadgets. In one implementation, gadget providers may launch advertising campaigns that include designation of a gadget as a master gadget. In another implementation, an auction-style system may be provided to gadget providers that allow the gadget providers to bid (e.g., against each other) for the status of master gadget. Gadget providers determine promotional (or "sponsorship") bids having a value based on a variety of factors, including the web site's content, traffic, time of day, and other known gadgets installed on the web site. The gadget provider submits a promotional bid for a gadget 214 that includes a monetary budget for being designated a master gadget and the duration of the promotion (e.g., single request, a user's session, entire day). As such, a master gadget may be chosen based on a winning bid or promotion (e.g., from a highest paying gadget provider) for a specified duration or user requests.

Figure 5:
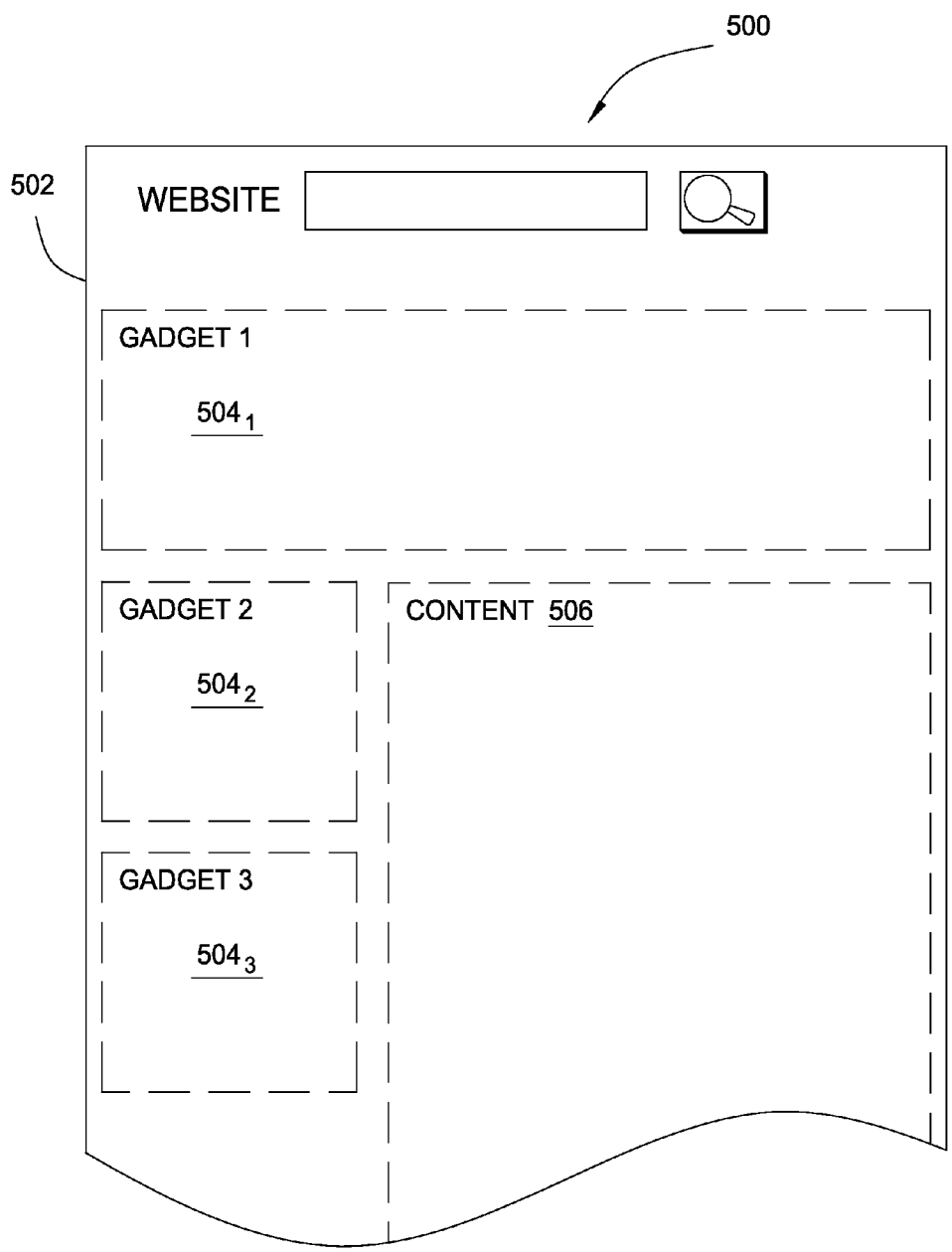
FIG. 5 illustrates another example graphical user interface having a plurality of gadgets, according to one embodiment of the disclosure.

In another approach, a hierarchy policy 216 specifies that a gadget 214 providing content that is most relevant to the containing web page may be chosen as a master gadget. For example, FIG. 5 illustrates another example user interface 500 that includes gadgets displayed in a web page according to one embodiment of the disclosure. In the embodiment shown, the user interface 500 provides a web page 502 having a plurality of gadgets $504_1$, $504_2$, $504_3$ (referred to collectively as gadgets 504) arranged alongside content 506 of the containing web page 502. Gadget framework 110 analyzes content provided by gadgets 504 in relation to content 506 of the containing web page 502. Relevancy of content may be measured using a number of algorithms that generate a metric for relevancy, such as word and/or concept matching, explicitly defined user interests, implicitly determined user interests (e.g., based on user's browsing history), social networking connections (e.g., bookmarks or user posts to social media, user circles having common interests), etc. As such, a gadget 504 that provides content most relevant to the containing web page 502 may be designated as a master gadget. For example, if content 506 of the containing web page is a sports article discussing results of a recent game, gadget framework 110 may determine that a gadget $504_2$ that provides local sports scores may be most relevant among gadgets 504 due to the commonality of concepts and interests (e.g., sports), and selects the gadget $504_2$ as the master gadget.

In yet another approach, a hierarchy policy 216 specifies that a gadget 214 having a "freshness" quality may be chosen as a master gadget. For example, gadgets 214 that are most recently added or deployed in a web page or that is the most popular gadget among other gadgets may be designated as a master gadget. In another example, a master gadget may be selected from gadgets that provide content having elevated popularity (sometimes referred to as "trending content"), such as gadgets that watch trends, prominent web searches, news stories, or best seller lists. The gadget framework 110 uses an information feed that indicates which content (e.g., posts, links, messages, phrases) are currently popular, or "trending".

In another approach, a hierarchy policy 216 determines master gadgets and slave gadgets based on the location of the gadgets 214 within the web page. As described above, gadgets 214 include positional information that indicates an order or location of the gadget within the containing web page. The hierarchy policy 216 specifies that any gadget 214 located at or proximate to a particular position within the containing web page may be designated as a master gadget. For example, in the embodiment shown in FIG. 5, a gadget $504_1$ is a banner-type element that contains advertising content and is placed in a pre-defined location for advertising (e.g., at the top of the web page 502). In this example, a hierarchy policy 216 may specify that any gadgets (e.g., gadget $504_2$) located near the advertising gadget $504_1$ may take on the style of the advertisement, or conversely, be styled so that the nearby advertisement is more prominent. In one implementation, the hierarchy policy 216 may specify locations within the web page using relative coordinates (e.g., x:−10 from main content), absolute coordinates (e.g., x:−100), pre-defined positions (e.g., top left), and other positional systems.

In another approach, a hierarchy policy 216 may designate a master gadget based on user addition and/or selection. The hierarchy policy 216 specifies that a gadget provided by an end user (e.g., web site visitor) may influence other gadgets 214. For example, a user customizable master gadget may contain user preferences (e.g., minimum font size, high contrast color scheme) that the end user wishes to enforce or influence onto other gadgets and page elements in the containing webpage.

In step 306, the gadget framework 110 generates a hierarchical relationship (referred to as a "master-slave" relationship) between the selected gadget and other gadgets according to the hierarchy policies 216. In one embodiment, the master-slave relationships may be generated between the master gadget and gadgets positioned or located near the master gadget within the containing web page. The hierarchy policies 216 may define threshold proximity that determines whether a particular gadget is proximate enough to the master gadget before generating a master-slave relationship between the master gadget and that particular gadget. In one implementation, the hierarchy policies 216 may include a distance value that defines a radius from the master gadget; gadgets located within the defined radius are designated as slave gadgets to the master gadget. In another implementation, where web pages provide pre-defined slots or positions for gadgets, the hierarchy policies 216 may represent the threshold proximity as a plus or minus value (e.g., −1, +2) relative to the position of the master gadget. Alternatively, the hierarchy policies 216 may include a continuous function that defines an amount of influence that a master gadget has over a particular gadget as a function of the distance between the master gadget and the particular gadget.

In one embodiment, the gadget framework 110 may enforce restrictions that prevent certain page elements or gadgets from being slaves to a master gadget. For example, such page elements as a header area of a web page containing a logo or masthead, a collection of navigation links, copyright notice, or a gadget provided by the site provider may be specified as immutable to influences from master gadgets.

The master-slave hierarchy may be applied to the containing web page as a whole, which results in selection of a single master gadget. Alternatively, the master-slave hierarchy may be applied to multiple local sections of the web page, resulting in multiple gadgets contained in the web page. For example, the gadget framework 110 may control a main theme of the containing web page using a "main" master gadget, followed by various sub themes controlled by the web page's various more localized master gadgets. To resolve how gadgets behave when under the influence of multiple master gadgets, multiple master gadgets may be assigned a priority relative to other master gadgets. A priority for a master gadget may be determined based on its identification or source. For example, a gadget provided by a site provider itself may have a high priority that corresponds to a high level of trust, while a gadget provided by a third-party gadget provider may have a lesser priority based on a lower level of trust from the web page. In one embodiment, a slave gadget is associated with the master gadget having the highest priority relative to other master gadgets. Alternatively, a slave gadget may have master-slave relationships with multiple master gadgets and the priority scheme is used to sort out how effects from the multiple master gadgets are reconciled.

In step 308, the gadget framework 110 modifies the slave gadgets based on the master gadget as specified by one or more style policies 218. The style policies 218 specify rules for how a master gadget influences the style, layout, and modality of slave gadgets and the content of slave gadgets. Style rules may include settings for font (e.g., size, family), colors, backgrounds, images, and other display or rendering configurations. Layout rules may include settings for gadget sizing margin and padding spacing, horizontal or vertical alignment, positioning, borders and outlines, and other display or rendering configurations for layout. For example, a style policy 218 may indicate that slave gadgets must conform to the same font color and typeface scheme of the master gadget to which they are related. In another example, a style policy 218 may specify a master gadget sponsored by a professional sports team influences its slave gadgets to conform to a color scheme of the professional sports team.

The layout of elements (e.g., page elements, gadgets) within a web page may be affected by changes to the gadgets as the gadgets automatically conform to a master gadget according to style policies 218. For example, slave gadgets may enlarge in response to increased font sizes of the gadget content or in response to an increase in video display resolution (e.g., HD, widescreen, 480p). In another example, slave gadgets may shrink or be bumped further down a page in deference to a master gadget's position and sizing. Accordingly, in one embodiment, style policies 218 provide layout rules that specify how a slave gadget may modify its layout within the containing web page in response to changes and influence from a master gadget. For example, layout rules may specify that, responsive to determining there is not enough room to adequately render content of a slave gadget due to influence from a master gadget, a slave gadget should minimize or reduce sizing, relocate further down on a web page, move to a different page, or not appear at all.

In some embodiments, a style policy 218 for a master gadget may specify rules that restrict content of affected slave gadgets according to the slave gadget's content and their suitability for a particular audience. For example, a site provider (e.g., Disney.com) may specify a style policy 218 for a master gadget that indicates no adult-oriented content may be displayed by gadgets influenced by the master gadget. The style policy 218 may specify that a slave gadget having restricted content not be displayed, or be replaced with a warning message notifying an end user of the content restriction. In one implementation, the style policy 218 may restrict and/or prescribe content according to a rating system that identifies content having graphic violence, profanity, and other content determined to be unsuitable for particular audiences (e.g., children). In another implementation, the style policy 218 may restrict and/or prescribe content according to predetermined lists of unacceptable content sources (e.g., black lists) and predetermined lists of acceptable content sources (e.g., white lists).

In one embodiment, the style policies 218 include modality rules that enable a master gadget to dictate how certain types of data may be rendered in a slave gadget, such as restricting display of images, video, plug-ins, and other embedded objects in a slave gadget or in other page elements contained in a web page. For example, to increase the effect of advertising contained in a master gadget, a site provider may specify a style policy 218 for the master gadget that prevents slave gadgets from displaying video, animations, or other media that might distract or reduce the effect of the advertising in the master gadget. In another example, to improve accessibility of a web page, a style policy 218 may specify modality rules that disable play back of audio or video content or substitute the corresponding textual content.

In one embodiment, style policies 218 for a master gadget may be provided by an end user to improve accessibility and usability of the web page containing the master gadget. The end user may provide a style policy 218 for the master gadget that specifies a requirement for any gadgets affected by the master gadget to provide formats and options for content accessibility. For example, an end user may provide a style policy 218 for a master gadget that enforces a user preference for a high level of text-to-background contrast, a certain font size, the use of close captioning in embedded videos, elimination of animation in a web page, the display of alternative text, tool tips, and other "hover"-type help text, etc. In some embodiments, a style policy 218 for accessibility may specify fallback rules that indicate a preference order for alternative embodiments of content provided by a gadget such that in cases where a gadget may not offer a first preferred accessible option, an alternative option for the content may be used instead. For example, a style policy 218 may specify that a slave gadget that provides video content should offer closed captioning, or if closed captioning is not available, then alternatively, a text transcript of the video content should be provided instead. In another example, a style policy 218 may specify that text content of a slave gadget be given a high contrast blue and yellow large font style, or if such a font style is unavailable, then alternatively, the text content should be styled such that background and text color values are inverted (e.g., "reverse video"). In some embodiments, the style policy 218 may include remedial rules for slave gadgets that are not configured to provide accessible options or formats specified by the style policies 218. For example, the style policy 218 may specify that any affected gadgets that do not provide the requested accessibility options be disabled, made inactive, removed, supplanted or supplemented with a notification that the affected gadget was determined to not be accessible, or other suitable remedial mechanisms. Accordingly, an end user can deploy a master gadget to force settings of other gadgets on the containing webpage, thereby allowing user preferences to be taken into account when rendering and/or displaying the content in gadgets and the containing web page.

As such, embodiments of the disclosure advantageously enable the "look and feel" of gadgets to be modified beyond the simpler concept of CSS rules, which provide limited rule-making and is manually performed, for determining gadget "themes" and "skinning". Advertisers and other third-parties may modify advertising gadgets in concert, either in conjunction or opposite to other gadgets' styles, thereby improving impact of the advertising and improving sales of their product and/or service. Additionally, embodiments of the disclosure advantageously enable automatic brand conformity. For example, a gadget provider (e.g., a technology company) may publish a gadget that is included on popular web portal sites. An entire web portal site, or key parts of it, could be turned to match the technology company's brand colors (e.g., blue and white) to match the master gadget's appearance, based on the factors described above (e.g., type of content in other gadgets, proximity to page element, highest bidder, etc.). In another application, a social networking site having user-generated items published in a news feed may wrap each item in a gadget such that items published may control the style and display of other content on the social networking site. As such, the social networking site may determine a priority for each user-generated item based on a variety of factors described above, and employ a number of policies to change the look and feel of its users' pages automatically.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for displaying a plurality of gadgets on a web page, comprising:
determining priority levels for the plurality of gadgets according to one or more hierarchy policies for the web page, wherein the gadgets are arranged in a grid on the web page;
generating master-slave relationships between a first one of the gadgets and one or more other gadgets having at least one priority level lower than a priority level of the first one of the gadgets, wherein the master-slave relationships are generated based on at least a proximity of the one or more other gadgets to the first one of the gadgets;
determining one or more style policies that specify a modification of the one or more other gadgets according to the master-slave relationships, wherein the modification to at least one of the one or more gadgets is a change in style, but not a change in content, that conforms to a style of the first one of the gadgets that has a higher priority level; and
outputting the one or more other gadgets according to the style policies.

2. The computer-implemented method of claim 1, wherein the step of determining priority levels further comprises:
determining a master priority level for the first one of the gadgets that is associated with a sponsorship bid selected according to a hierarchy policy that specifies a highest sponsorship bid policy.

3. The computer-implemented method of claim 1, wherein the step of determining priority levels further comprises:
determining a relevancy metric for content of each of the plurality of gadgets; and
determining a master priority level for the first one of the gadgets that has a highest relevancy metric according to a hierarchy policy that specifies content relevancy.

4. The computer-implemented method of claim 1, wherein the step of determining priority levels further comprises:
determining a popularity metric for content of each of the plurality of gadgets; and
determining a master priority level for the first one of the gadgets that has a highest popularity metric according to a hierarchy policy that specifies master priority for trending content.

5. The computer-implemented method of claim 1, wherein the step of determining priority levels further comprises:
   determining a master priority level for the first one of the gadgets according to a hierarchy policy that specifies master priority based on a location of the gadget within the web page.

6. The computer-implemented method of claim 1, wherein the one or more style policies specify a modification to at least one of a style, layout, and modality of an affected gadget.

7. The computer-implemented method of claim 1, wherein the one or more style policies specify an order of preference for alternative formats of content of an affected gadget.

8. The computer-implemented method of claim 1, wherein the step of determining priority levels further comprises determining a master priority level for more than one of the gadgets.

9. A computer program product, comprising:
   a computer-readable storage medium having computer-readable program code embodied therewith, the computer-readable program code comprising:
      computer-readable program code configured to determine priority levels for a plurality of gadgets on a web page according to one or more hierarchy policies for the web page, wherein the gadgets are arranged in a grid on the web page;
      computer-readable program code configured to generate master-slave relationships between a first one of the gadgets and one or more other gadgets having at least one priority level lower than a priority level of the first one of the gadgets, wherein the master-slave relationships are generated based on at least a proximity of the one or more other gadgets to the first one of the gadgets;
      computer-readable program code configured to determine one or more style policies that specify a modification of the one or more other gadgets according to the master-slave relationships, wherein the modification to at least one of the one or more gadgets is a change in style, but not a change in content, that conforms to a style of the first one of the gadgets that has a higher priority level; and
      computer-readable program code configured to output the one or more other gadgets according to the style policies.

10. The computer program product of claim 9, wherein the computer-readable program code configured to determine the priority levels further comprises:
   computer-readable program code configured to determine a master priority level for the first one of the gadgets that is associated with a sponsorship bid selected according to a hierarchy policy that specifies a highest sponsorship bid policy.

11. The computer program product of claim 9, wherein the computer-readable program code configured to determine the priority levels further comprises:
   computer-readable program code configured to determine a relevancy metric for content of each of the plurality of gadgets; and
   computer-readable program code configured to determine a master priority level for the first one of the gadgets that has a highest relevancy metric according to a hierarchy policy that specifies content relevancy.

12. The computer program product of claim 9, wherein the computer-readable program code configured to determine the priority levels further comprises:
   computer-readable program code configured to determine a popularity metric for content of each of the plurality of gadgets; and
   computer-readable program code configured to determine a master priority level for the first one of the gadgets that has a highest popularity metric according to a hierarchy policy that specifies master priority for trending content.

13. The computer program product of claim 9, wherein the computer-readable program code configured to determine the priority levels further comprises:
   computer-readable program code configured to determine a master priority level for the first one of the gadgets according to a hierarchy policy that specifies master priority based on a location of the gadget within the web page.

14. The computer program product of claim 9, wherein the one or more style policies specify a modification to at least one of a style, layout, and modality of an affected gadget.

15. A system, comprising:
   one or more computer processors; and
   a memory containing a program, which, when executed by the one or more computer processors, performs an operation for providing a plurality of gadgets on a web page, the operation comprising:
      determining priority levels for a plurality of gadgets according to one or more hierarchy policies for the web page, wherein the gadgets are arranged in a grid on the web page,
      generating master-slave relationships between a first one of the gadgets and one or more other gadgets of the plurality of gadgets having at least one priority level lower than a priority level of the first one of the gadgets, wherein the master-slave relationships are generated based on at least a proximity of the one or more other gadgets to the first one of the gadgets,
      determining one or more style policies that specify a modification of the one or more other gadgets according to the generated master-slave relationships with the first one of the gadgets, wherein the modification to the one or more other gadgets is a change in style, but not a change in content, that conforms to a style of the first one of the gadgets, and
      outputting the one or more other gadgets according to the style policies.

16. The system of claim 15, the operation further comprising:
   identifying the first one of the gadgets that is associated with a sponsorship bid selected according to a hierarchy policy that specifies a highest sponsorship bid policy.

17. The system of claim 15, the operation further comprising:
   determining a relevancy metric for content of each of the plurality of gadgets; and
   determining a master priority level for the first one of the gadgets that has a highest relevancy metric according to a hierarchy policy that specifies content relevancy.

* * * * *